Figure 1:
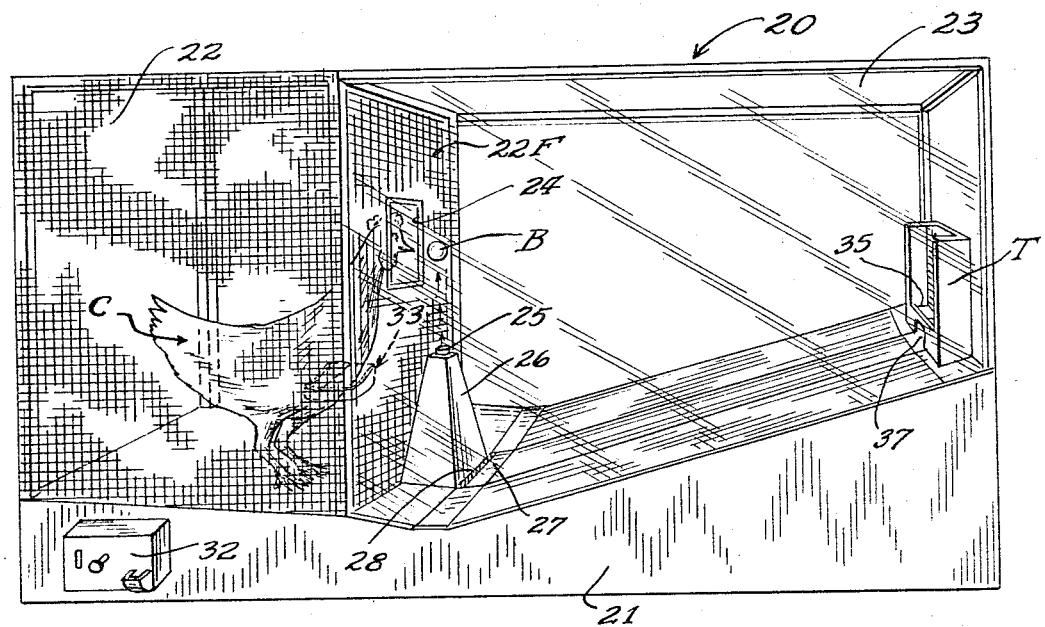

Jan. 10, 1967   G. EVANS   3,297,324
TRAINED ANIMAL OPERATED AMUSEMENT APPARATUS
Filed Sept. 20, 1963   5 Sheets-Sheet 1

Inventor
Grant Evans.
By Mann, Brown & McWilliams
Attys.

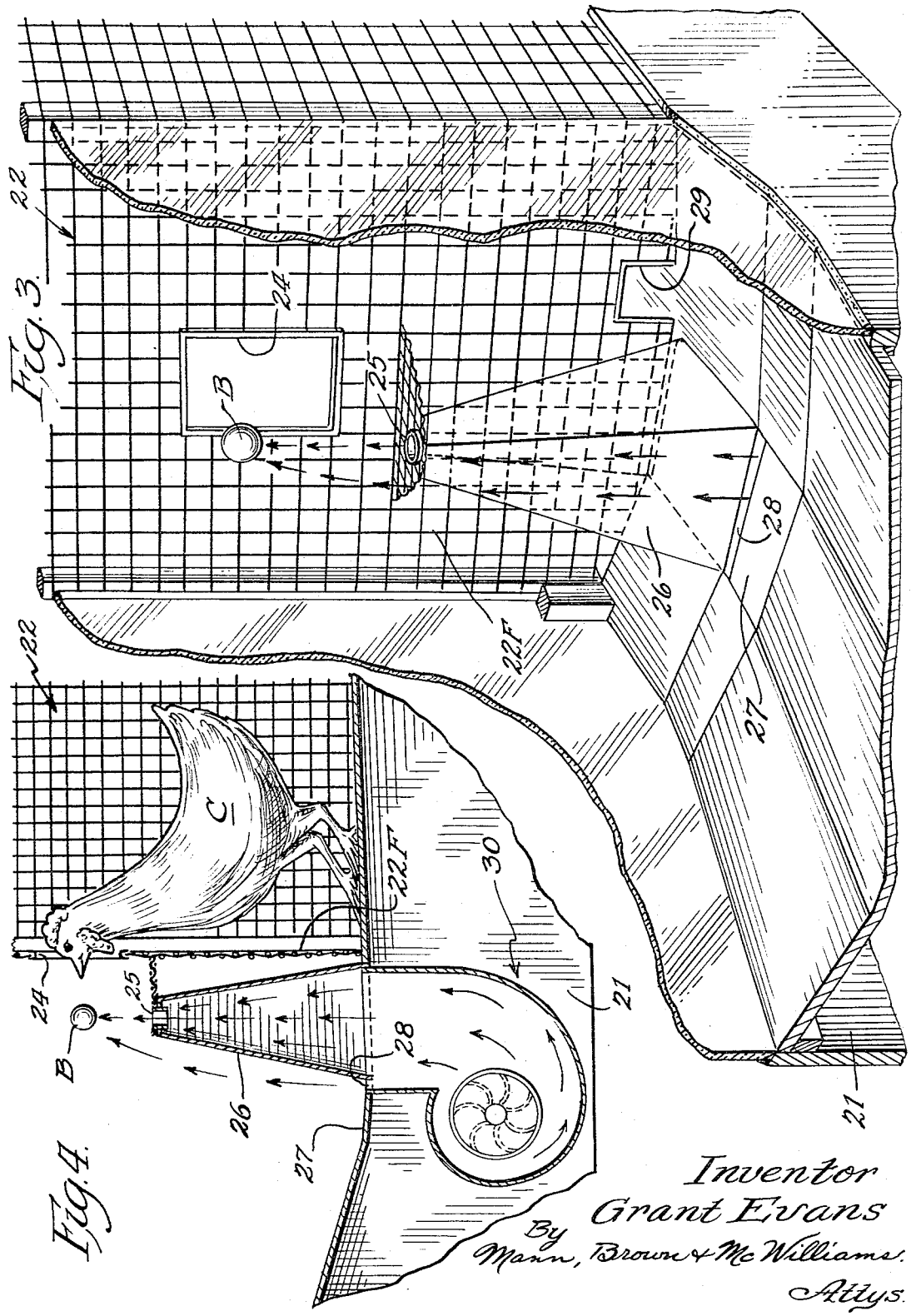

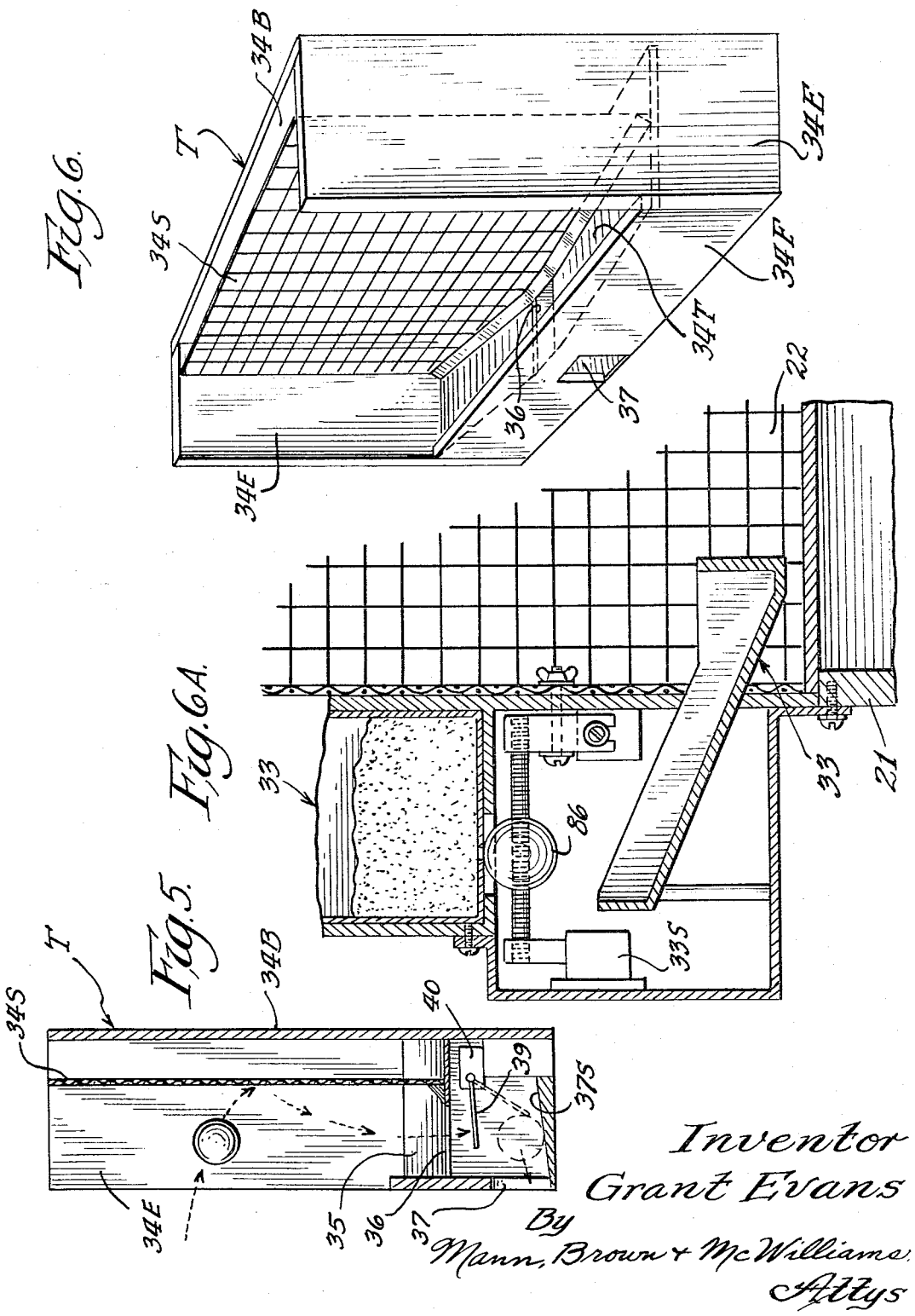

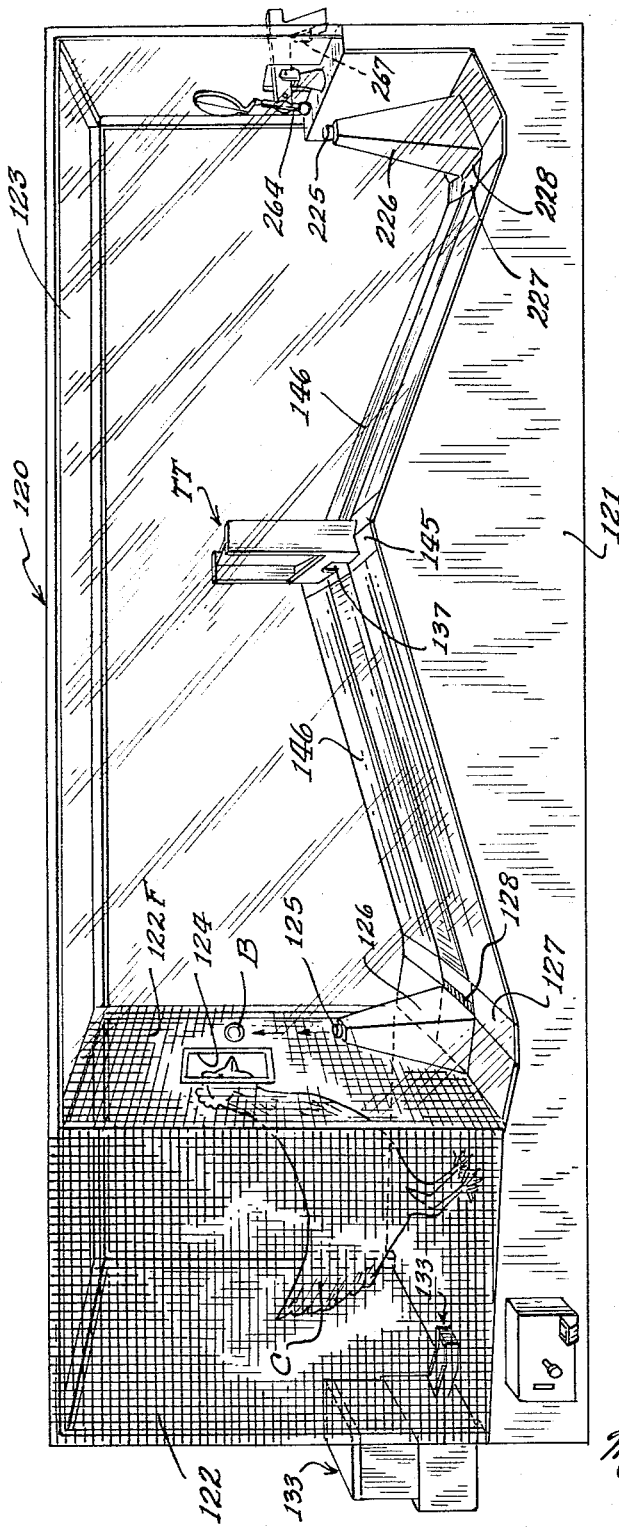
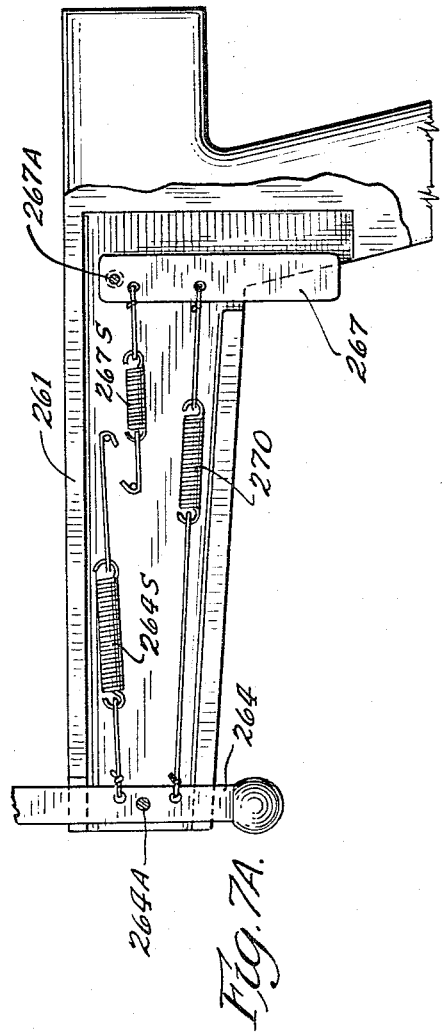

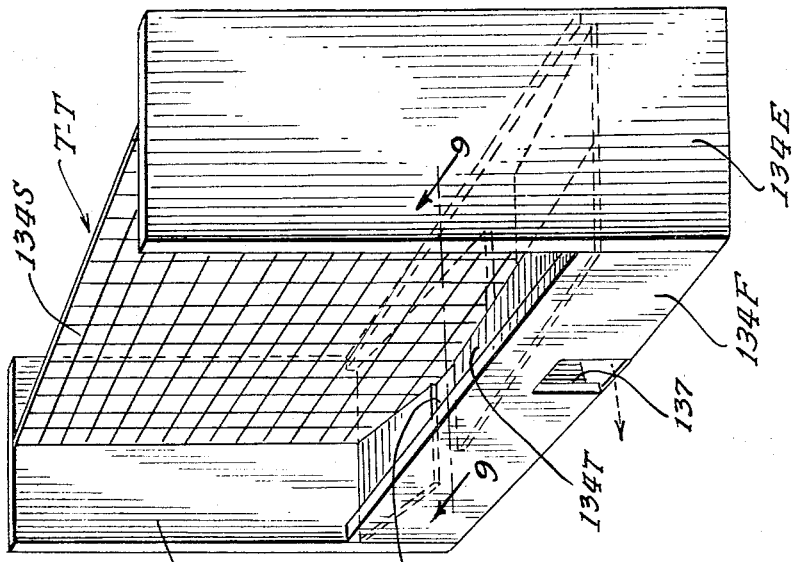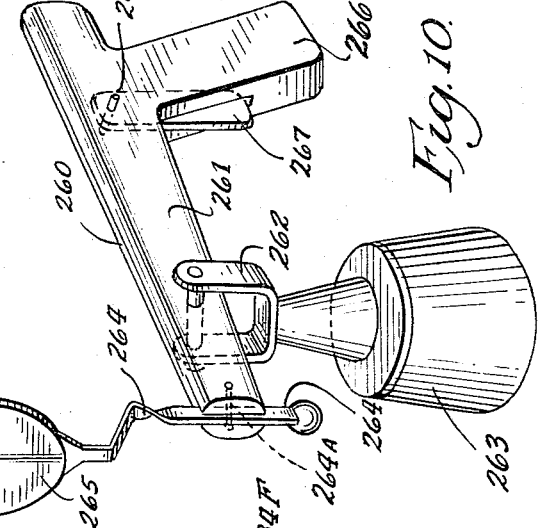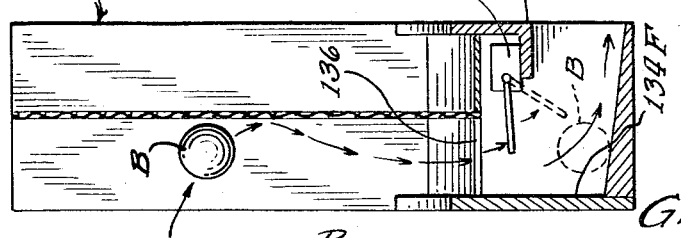

United States Patent Office 3,297,324
Patented Jan. 10, 1967

3,297,324
TRAINED ANIMAL OPERATED
AMUSEMENT APPARATUS
Grant Evans, Hot Springs, Ark., assignor to Animal Behavior Enterprises, Inc., a corporation of Arkansas
Filed Sept. 20, 1963, Ser. No. 310,307
9 Claims. (Cl. 273—101)

This invention relates to amusement apparatus and particularly to such an apparatus wherein a trained animal performs to provide the amusement.

Animals such as chickens, rabbits, cats and the like may be trained to perform a wide variety of acts or tricks, and after the performance of the trick, it is the usual practice to provide a reward for the animal such as a limited serving of food. Of the many tricks or acts that may be performed by trained animals of this kind, some of the most spectacular and interesting performances involve the striking or impelling of a ball by the animal, and to present such a performance to its best advantage, the ball must be positioned substantially stationary in mid air and in a substantially unrestrained relation at the time when it is to be struck and propelled by the animal. Such positioning of the ball has heretofore been attained manually by the trainer, so that such ball impelling tricks were not adaptable for use in coin controlled or automatic amusement apparatus.

It is therefore an important object of this invention to provide such an apparatus that is effective to utilize the talents of trained animals of the general kind above mentioned and which is nevertheless capable of operation in a simple and reliable manner and without the necessity for a great deal of maintenance and service. More particularly, it is an object of the invention to provide such an amusement apparatus wherein a ball may be supported on air blast in position where such ball may be actuated by the trained animal toward a target so that when the target is hit by the ball, the desired reward for the trained animal may be automatically provided.

In carrying out this invention, the cage in which the animal is housed is located at one end of a ball enclosure space and an air nozzle is provided adjacent the cage so that a ball may be supported on the air jet issuing from the nozzle in a position such that the animal may peck or strike the ball toward the target. The nozzle has means associated therewith for elevating the ball into association with the nozzle, and the floor surfaces of the cage and the ball enclosure are sloped so that the ball will roll back from any point within the apparatus into a position where the loading or elevating means may operate upon the ball to put it into position on the supporting air jet.

In a more elaborate embodiment of the present invention the amusement apparatus provides for what amounts to a contest between a human player and the trained animal so that the animal and the human contestant may alternately have an opportunity to strike the ball toward an intermediate target.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

Figure 2:
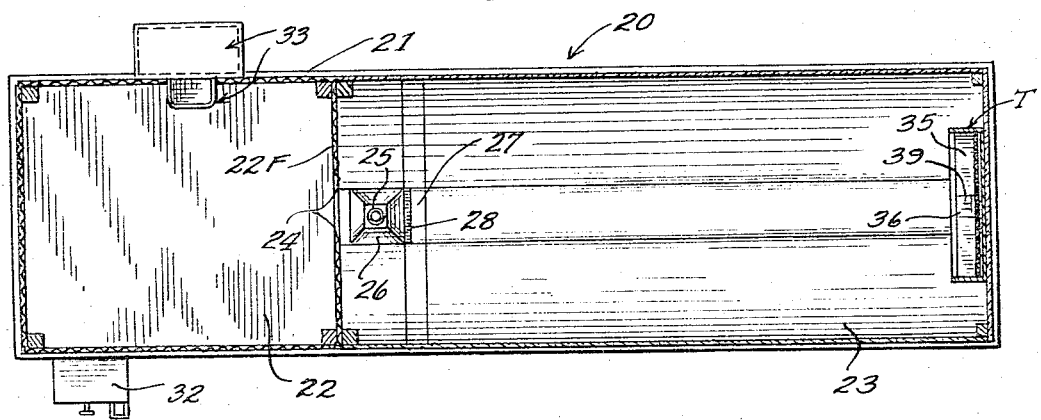

In the drawings:

FIG. 1 is a front perspective view of a coin-controlled amusement device embodying the features of the invention;

FIG. 2 is a plan view thereof;
FIG. 3 is a fragmentary perspective of a portion of the apparatus;
FIG. 4 is a fragmental vertical sectional view of the device;
FIG. 5 is a fragmentary vertical sectional view of the target;
FIG. 6 is a perspective view of the target;
FIG. 6A is a fragmentary vertical section of the feeder;
FIG. 7 is a front perspective of another embodiment of the invention;
FIG. 7A is a longitudinal sectional view of the paddle gun used in the embodiment of FIG. 7;
FIG. 8 is a perspective view of the target employed in the embodiment of FIG. 7;
FIG. 9 is a vertical sectional view of the target shown in FIG. 8;
FIG. 10 is a perspective view of the paddle gun used in the embodiment of FIG. 7.

For purposes of disclosure the invention is herein illustrated in two different embodiments, the first embodiment being coin-controlled animal operated unit 20 shown in FIGS. 1 to 6 wherein a trained animal such as a chicken C, upon successfully propelling a ball B into a target T, is rewarded by a limited serving of food, and a second embodiment, as shown in FIGS. 7 to 11, being a coin-controlled amusement apparatus 120 in which a trained animal such as the chicken C located at one end of the unit, may alternately propel the ball B toward a central target TT so that an amusing competitive situation is introduced into the operation and use of the apparatus. Here, again, a reward of food is provided for the chicken upon each successful performance.

In the apparatus 20 of FIGS. 1 to 6 an elongated rectangular base 21 has a two-compartment enclosure thereon, one of which is located at the left end of the base 21 and constitutes a cage 22 within which the chicken C is housed, and the other compartment constitutes a ball enclosure 23 extending to the other end of the base 21 and having the target T mounted in an elevated relation at the remote or right hand end of such enclosure.

The cage 22 and the ball enclosure 23 are formed by walls made of such material that the movements of the ball B and the action of the chicken C may readily be viewed by an audience. Thus, the cage 22 as herein shown is made of a wire mesh, while the walls of the ball enclosure 23 are shown as being made from glass.

The wall between the cage 22 and ball enclosure 23 may be said to constitute a front wall 22F of the cage, and at a proper height determined by the size of the chicken C, an opening 24 is provided in the wall 22F through which the chicken C may extends its head to impel the ball B from the position shown in FIG. 1 toward the target T.

The ball B is preferably quite light, and may be the usual type of table tennis ball, and this ball is supported in the position shown in FIG. 1 by an air blast or jet that is emitted in an upward direction from a nozzle 25, this nozzle being mounted in and forming part of a truncated pyramid 26 that extends upwardly from the floor of the ball enclosure 23 just upwardly of the opening 24. The structure and operation of the nozzle 25 and the related means will be described in some detail hereinafter, but it may be pointed out that in the operation of the apparatus it is essential that the ball B, after being propelled toward or into the target T, be returned to a loading position where it may again be elevated to the top of the nozzle 25. For this reason, the top of the base 21 is formed as a floor for the two compartments 22 and 23, and this floor slopes so that the ball will roll by gravity to a low point 27 just forwardly of the forward side of the pyramid 26, and in this low point or loading position a slot 28 is formed in such a position that the ball B will come to rest across the slot 28 and resting at one side against the adjacent side of the pyramid 26. The floor that is provided by the base 23 slopes to the left in FIG. 1 from the target T to the low point 27, and other sloping surfaces are formed on both sides of the pyramid 26 and within the cage C so that the ball will return to its home position across the slot 28 by gravity from any point within the cage or the ball enclosure. Such return involves the provision of an opening 29 in the front wall 22F as shown in FIG. 3 so that the ball B may roll from the cage 22 on its way to the loading position across the slot 28.

The air that is to be forced through the nozzle 25 and the slot 28 is provided by a motor driven fan or blower 30 mounted within the base 21 as illustrated in FIG. 4 and arranged to discharge the major portion of its output through the pyramid 26 and the nozzle 25 while also discharging a minor proportion of the air through the slot 28.

When a ball B rests in position across the slot 28, operation of the blower 30 causes the air passing through the slot 28 to lift the ball B and force the same upwardly along the adjacent forward face of the pyramid 26, and when the ball reaches the height of the nozzle 25, it moves into position over the nozzle 25 and is propelled upwardly to assume a stable position wherein it is supported by an air jet directly in front of the opening 24 in the front wall 22F.

In accomplishing the elevation of the ball B from the slot 28 into position on the air jet that issues from the nozzle 25, the location of the slot 28 and the form and relationship of the front wall of the pyramid 26 is important. Thus it will be noted that the center of the slot 28 is located at the center of the base of the front wall of the pyramid 26. With this relationship, an automatic balancing action of the air issuing from the slot 28 maintains the ball B on a path that is centered between the opposite edges of the front side of the pyramid 26, and hence when the ball reaches the upper edge of the pyramid, it is properly centered in a longitudinal vertical plane with respect to the air jet issuing from the nozzle 25. At the upper edge of the pyramid, there is an interaction between the air that flows from the slot 28 and the air that flows from the nozzle 25, and this causes the ball B to move rearwardly toward a centered relationship with respect to the nozzle 25.

It is important to note that by the use of the loading action of the air from the slot 28, the nozzle 25 may be supported in a substantially elevated relationship with respect to the low point 27 of the enclosure, and hence the ball B may be carried on the main air jet at a relatively low height with respect to the location of the nozzle 25. This in turn enables relatively low velocity, low pressure air to be utilized in the apparatus.

Such transfer of the ball B from a position over the slot 28 into the elevated position on the air jet takes place whenever the ball B returns to its position across the slot 28, and this cycle will be repeated so long as the blower 30 remains in operation.

The blower 30 is set into operation by coin-controlled means such as a coin slot mechanism 32 of conventional construction and the blower continues in operation for a limited time period or until a full predetermined cycle of operation of the amusement apparatus has been completed, as will be described. The cage 22 has a mechanical feeder 33 associated therewith so that in any cycle of operation of the feeder 33 a measured amount of food is dispensed into the cage 22. The feeder 33 may be of the construction shown in the Breland Patent No. 2,796,044 and with such a feeder, a cycle of operation may be caused by operation of a solenoid 33S to momentarily move the valve member 86 to release a small amount of food from the hopper thereof.

When the coin slot mechanism 32 is operated so as to start operation of the blower 30, the ball B will be immediately raised from its position over the slot 28 into a position above the air jet that will then be issuing from the nozzle 25, and the ball B will then move up to a stable position opposite the opening 24 of the cage and within the range of pecking movement of the chicken C. The chicken C having been trained, will peck the ball B toward the target T. The target T is shown in some detail in FIGS. 5 and 6 and is somewhat box-like in form in that it has end walls 34E, a back wall 34B, and a relatively low front wall 34F so that a ball propelled toward the target may pass through the open upper portion of the front of the target to strike a transverse screen 34S.

When a ball B strikes the screen 34S, the ball drops downwardly onto sloping surfaces 34T as shown in FIG. 6, and the ball rolls toward the center portion of the target where a downward opening or passage 36 is provided. The ball then moves downwardly through the passage 36, and in this movement actuates the operating arm 39 of a control switch 40. The ball then moves on downwardly and onto a sloping surface 37S so that the ball moves out of the interior of the target T, through a passage discharge opening 37 and rolls back to its home position over the slot 28.

The actuation of the control switch 40 causes an operating circuit to the solenoid 33S to be momentarily closed, and this causes operation of the feeder 33. A reward that is thus promptly provided constitutes an incentive for the animal to repeat its performance whenever the ball B is within pecking range of the opening 24.

It has been noted above that in the coin-operated amusement apparatus 20, the starting of the blower under control of a coin mechanism causes the blower to continue to operate for a period that may be limited in different ways. Thus control circuits of conventional design may be used including a timer or score counter to break the holding circuit for the motor after a predetermined time period, or the holding circuit for the blower may be governed by a counting mechanism which will stop the blower after the feeder 33 has been operated a predetermined number of times, and in such an instance an overriding control in the form of a timer may be employed also.

It is important to note, however, that the amusement apparatus of the present invention may in some instances be employed in the arcade type of amusement center and in such an instance of course the coin control would be eliminated and the blower would operate continuously under manual control.

The unit 120 that is shown in FIGS. 7 to 11 of the apparatus is constructed in many respects the same as the embodiment 20, with the additional provision for manual propelling of the ball B by a human contestant. Thus the unit 120 has a base 121 with a cage 122 at one end and with a ball enclosure 123 extending from the cage 122 to the other end of the base, the length of this ball enclosure being substantially double that of the ball enclosure hereinbefore described. The base 121, within the ball enclosure, has an upper surface formed to provide a relatively high central area 145 from which sloping surfaces 146 extend downwardly to low points 127 adjacent opposite ends of the ball enclosure 123. Adjacent the cage 122, a nozzle 125 is provided at the upper end of a truncated pyramid 126, and an associated air slot 128 is provided in the same manner as in the previously described embodiment so that a ball B may be elevated in position in front of an opening 124 in the front wall of the cage. This enables the animal C within the cage to propel such a ball toward a target TT that is mounted at the high point 145 of the base, and the operation is the same as in the previously described embodiment.

The target TT is, in this instance, somewhat different in structure in that it has a transverse screen 134S located so that the screen may be hit by a ball propelled from either end of the ball enclosure 123. The target TT is shown in some detail in FIGS. 8 and 9, and it has end walls 134E which support the transverse screen 134S and it has front walls 134F on both sides of the target, these walls being relatively low and cooperating with bottom walls 134T to form traps on opposite sides of the screen 134S. On one side of the screen 134S, the sloping walls 134T cause a ball to roll toward and through a passage 136, but it will be noted that each of these passages 136 discharges through the opposite one of the walls 134F. Thus, when the animal C propels the ball B into the adjacent side of the target TT, the ball rolls downwardly through the opening 136 and is discharged on the other side of the target and toward the right hand end of the enclosure 123 as viewed in FIG. 7. In this movement, a switch 140 is operated and this causes operation of a feeder 133 that is associated with the cage 122.

When the ball B is thus discharged from the opposite or right hand side of the target TT, it rolls down the surface 146 to the low point 227 and into position over an air slot 228 that is associated with a pyramid 226 and a nozzle 225 as hereinabove described with respect to the other embodiment of the invention. The ball B is thus quickly raised into position on the air jet that is being discharged from the nozzle 225, and while the ball is thus supported, a human contestant may, through operation of a manually positioned and operated paddle gun 260, propel the ball back toward the adjacent side of the target TT, the ball drops into the associated pocket of the target TT and is returned through the opening 137 to the area of the enclosure 123 that is adjacent to the cage 122. The ball thus rolls downwardly toward the cage 122 and is elevated again to a position where it is supported in front of the cage 122 so that it may again be propelled by the trained animal C.

The paddle gun 260 is shown in detail in FIGS. 10 and 11. Thus the gun comprises a body 261 universally mounted by means including a yoke 262 on a supporting pedestal 263. The body 261 has a vertically extending arm or lever 264 at its forward end that is pivoted on a horizontal axis 264A and which has a paddle 265 at its upper end. At its other or rear end the body 261 has a downwardly extending pistol grip 266 with an associated operating trigger 267.

The operator may grasp the pistol grip 266 to manipulate the gun and the paddle to the desired position, and by operation of the trigger 267 may swing the paddle 265 about its supporting pivot 264A to thereby hit the ball B and propel the same toward the target. The operating connections between the trigger 267 and the operating arm 264 are shown in FIG. 7A. Thus the trigger is pivoted at 267A at its upper end and the trigger is urged upwardly by a return spring 267S. The paddle 265 is normally withdrawn in a rearward direction by a return spring 264S that is connected to the body 261 to the lever 264 at a point above the pivot 264A.

The operating connection between the trigger 267 and the lever 264 is provided by a relatively strong spring 270 that is connected between the trigger 267 and a lower portion of the lever 264. When the trigger 267 is drawn rearwardly or to the right in FIG. 7A, the arm or lever 264 is rocked so as to impart a striking movement to the paddle 265.

From the foregoing description it will be apparent that the present invention provides a new and improved amusement apparatus that makes use of talents of trained animals and further it will be apparent that the present invention enables the well known capabilities of trained animals in striking and propelling balls to be utilized without requiring constant attention and effort on the part of a trainer. More specifically, it will be evident that the present invention enables ball propelling tricks to be performed by trained animals in coin controlled apparatus so that supervision of the trained animal is not required.

Thus while preferred embodiments of the invention has been illustrated herein, it is to be understood that changes and variations may be made by those skilled in the art without departing from the spirit and scope of the appended claims.

I claim:

1. In an animal operated amusement apparatus, a cage having walls through which a trained animal housed in the cage may be viewed, and including a front wall having an opening therein through which such an animal may reach to strike and impel a ball, an air discharge nozzle mounted in front of said front wall in the vertical center plane of said opening and positioned to discharge a column of air in a vertical direction past and spaced a short distance forwardly of said opening, a target located substantially forwardly of said nozzle and having an open top ball-receiving pocket into which a ball striking said target will fall, a gravity return path for a ball including a ball return passage into which a ball will roll from said pocket, a ball-operated switch having an operating element extended into said passage in position to be actuated by a ball moving through the passage, said gravity return path comprising a floor over which a ball may roll to a low point immediately in front of and substantially below the discharge orifice of said nozzle, said floor at said low point having an air discharge slot over which the ball comes to rest, an upwardly and rearwardly directed surface at the rear side of the slot along which an air blast issuing from said slot may actuate a ball upwardly into position over said nozzle for subsequent support of the ball in front of said opening on the air column issuing from said nozzle, fan means effective when operating to discharge air from said slot and nozzle, coin controlled means for initiating operation of said fan means, feeder means associated with said cage for discharging a measured quantity of feed within the cage whenever said feeder means is operated through a feeding cycle, and means governed by said ball operated switch to initiate a feeding cycle of said feeding means each time the ball switch is closed.

2. In a coin controlled, animal operated amusement apparatus, a cage having walls through which a trained animal housed in the cage may be viewed, and including a front wall having an opening therein through which such an animal may reach to strike and impel a ball, an air discharge nozzle mounted in front of said front wall in the vertical center plane of said opening and positioned to discharge a column of air in a vertical direction past and spaced a short distance forwardly of said opening, a target located substantially forwardly of said nozzle and having an associated gravity return path for a ball including a ball return passage, a ball-operated switch having an operating element extended into said passage in position to be actuated by a ball moving through the passage, said gravity return path terminating in a low point immediately adjacent and substantially below the discharge orifice of said nozzle, a floor member at said low point having an air discharge slot over which the ball comes to rest, an upwardly and rearwardly directed surface along said slot along which an air blast issuing from said slot may actuate a ball upwardly into position over said nozzle for subsequent support of the ball in front of said opening on the air column issuing from said nozzle, fan means effective when operating to discharge air from said slot and said nozzle, coin-operated means for initiating operation of said fan means, and feeder means associated with said cage for discharging a measured quantity of feed within the cage whenever said feeder means is operated through a feeding cycle, governed by said ball-operated switch to initiate a feeding cycle of said feeding means each time the ball-operated switch is closed.

3. In an animal operated amusement apparatus, a cage having walls through which a trained animal housed in the cage may be viewed, and including a front wall having an opening therein through which such an animal may reach to strike and impel a ball, a vertically directed air discharge nozzle mounted in front of said opening, a target located substantially forwardly of said nozzle and having an associated gravity return path for a ball including a ball return passage, said gravity return path terminating in a low point immediately adjacent and substantially below the discharge orifice of said nozzle, a floor member at said low point having an air discharge slot over which the ball comes to rest, an upwardly and rearwardly directed surface along said slot along which an air blast issuing from said slot may actuate a ball upwardly into position over said nozzle for subsequent support of the ball in front of said opening on the air column issuing from said nozzle, fan means effective when operating to discharge air from said slot and said nozzle, feeder means associated with said cage for discharging a measured quantity of feed within the cage whenever said feeder means is operated through a feeding cycle, and means in said ball return passage operable on passage of a ball to initiate a feeding cycle of said feeding means.

4. In an amusement apparatus for providing an effective game of skill between a human contestant and a trained animal, an elongated base having a playing area having surfaces sloping in opposite endwise directions from an elevated dividing line located intermediate opposite ends of the base and terminating in low points near said ends and spaced substantially from said elevated dividing line, an upstanding target disposed at said dividing line adapted to be struck by a ball propelled from either end of said playing area and having open top ball-receiving pockets on opposite sides of the target, each of said pockets having a ball discharge passage for discharging a ball therefrom to the opposite side of said dividing line, a pair of air discharge nozzles, one of which is mounted adjacent each of said low points to discharge a column of air in a vertical direction, slots in said surfaces of the playing area at each low point and adjacent each of said nozzles for discharging air to propel a ball from the low point into position over the adjacent nozzle, fan means for forcing air through said slots and said nozzles, a cage mounted between one of said nozzles and the adjacent end of the base and having walls through which an animal housed in the cage may be viewed, said cage having a front wall with an opening therein through which such an animal may strike and impel a ball from a point of support on an air blast issuing from the adjacent nozzle, feeder means associated with said cage for discharging a measured quantity of feed in each operating cycle, a manually operable ball impeller located at the other end of said playing area and adapted to be used by a human contestant for impelling a ball toward said target, and means operable in response to passage of a ball through one of said ball discharge passages of the target for initiating an operating cycle of said feeder.

5. In an amusement apparatus, an elongated base having a playing area having surfaces sloping in opposite endwise directions from an elevated dividing line located intermediate opposite ends of the base and terminating in low points near said ends and spaced substantially from said elevated dividing line, an upstanding target disposed at said dividing line adapted to be struck by a ball propelled from either end of said playing area, means operable when the target is struck by a ball on one side for discharging a ball therefrom to the opposite side of said dividing line, a pair of air discharge nozzles, one of which is mounted adjacent each of said low points to discharge a column of air in a vertical direction, means located at each low point and adjacent each of said nozzles for elevating a ball from the low point into position over the adjacent nozzle, fan means for forcing air through said nozzles, a cage mounted between one of said nozzles and the adjacent end of the base and having walls through which an animal housed in the cage may be viewed, said cage having a front wall with an opening therein through which such an animal may reach to strike and impel a ball from a point of support on an air blast issuing from the adjacent nozzle, feeder means associated with said cage for discharging a measured quantity of feed in each operating cycle thereof, a manually operable ball impeller located at the other end of said playing area for impelling a ball toward said target, and means operable when a ball strikes one side of the target for initiating an operating cycle of said feeder.

6. In an amusement apparatus, an elongated base having a playing area having surfaces sloping in opposite endwise directions from an elevated dividing line located intermediate opposite ends of the base and terminating in low points near said ends and spaced substantially from said elevated dividing line, an upstanding target disposed at said dividing line adapted to be struck by a ball propelled from either end of said playing area, means operable when the target is hit by a ball on one side thereof for discharging a ball to the opposite side of said dividing line, a pair of air discharge nozzles located respectively adjacent each of said low points to discharge a column of air in a vertical direction, means for moving a ball from the low point adjacent each of said nozzles into position over the adjacent nozzle, fan means for forcing air through said nozzles, a cage mounted between one of said nozzles and the adjacent end of the base and having walls through which an animal housed in the cage may be viewed, said cage having a front wall with an opening therein through which such an animal may reach to strike and impel a ball toward the target from its point of support on the air blast issuing from the adjacent nozzle, feeder means associated with said cage for discharging a measured quantity of feed in each operating cycle thereof, a manually operable ball impeller located at the other end of said playing area for impelling a ball toward said target, and means operable when a ball strikes one side of the target for initiating an operating cycle of said feeder.

7. In an amusement apparatus for providing a game-like contest between a human player and a trained animal, an elongated base having a playing area having floor surfaces sloping in opposite endwise directions from an elevated dividing line located intermediate opposite ends of the base and terminating in low points near said ends, target means disposed at said dividing line adapted to be struck by a ball, means associated with the target means for discharging the ball onto one or the other of said sloping surfaces, a pair of air discharge nozzles, one of which is mounted adjacent each of said low points to discharge a column of air in a vertical direction, means operable to raise a ball from the low point into position over the adjacent nozzle, fan means for forcing air through said nozzles, a cage mounted between one of said nozzles and the adjacent end of the base and having walls through which an animal housed in the cage may be viewed, said cage having a front wall with an opening therein through which such an animal may reach to strike and impel a ball from a point of support on an air blast issuing from the adjacent nozzle, feeder means associated with said cage for discharging a measured quantity of feed in each operating cycle, a manually operable ball impeller located at the other end of said playing area for impelling a ball toward said target, and means operable when a ball strikes said target means for initiating an operating cycle of said feeder.

8. In an amusement device of the type described,
a cage in which a trained animal may be housed,
said cage including a front wall having an opening therein through which such an animal may reach to strike and impell a ball,
a vertically directed air discharge nozzle mounted in front of said opening,
a target located substantially forwardly of said nozzle,
a base extending between said target and said nozzle,
said target and said base defining a gravity return path for a ball including a ball return passage, said ball return path leading to a ball loading position at a low point adjacent and substantially below the discharge orifice of said nozzle, blower means effective when operating to discharge air from said nozzle for forming a jet of air on which the ball may be supported, means for air loading the ball on the jet issuing from said nozzle, feeder means associated with said cage for discharging a measured quantity of feed within said cage whenever said feeder is operated through a feeding cycle, and means in said ball return passage operable on passage of a ball to initiate a feeding cycle of said feeding means.

9. In an amusement apparatus, a ball enclosure, a vertically directed air discharge nozzle mounted therein from which a jet of air may be discharged in an upward vertical direction for supporting a ball on such air jet in a playing position, a target mounted in said ball enclosure and spaced from said nozzle, a base extending between said target and said nozzle, said target and said base defining a gravity return path for a ball, said ball return path leading to a low point adjacent and substantially below the discharge orifice of said nozzle, said base being formed to define an air slot disposed at said low point and positioned adjacent to but externally of said nozzle, said slot extending crosswise of said nozzle and being centered with respect to said nozzle, said nozzle exterior that is adjacent said slot being formed to define a ball movement guiding surface extending from said low point and adjacent said slot upwardly and projected toward the plane of said jet, said slot being formed to direct air issuing therefrom substantially lengthwise of said surface to lift a ball upwardly from said low point onto said jet, and blower means effective when operating to discharge air from said nozzle orifice to form said jet and from said slot to lift the ball onto the jet.

References Cited by the Examiner

UNITED STATES PATENTS

| 2,796,044 | 6/1957 | Breland | 119—29 |
| 2,796,045 | 6/1957 | Breland | 119—29 |

FOREIGN PATENTS

| 813,051 | 5/1937 | France. |
| 599,930 | 7/1934 | Germany. |

DELBERT B. LOWE, *Primary Examiner.*

ANTON O. OECHSLE, M. R. PAGE,
*Assistant Examiners.*